UNITED STATES PATENT OFFICE.

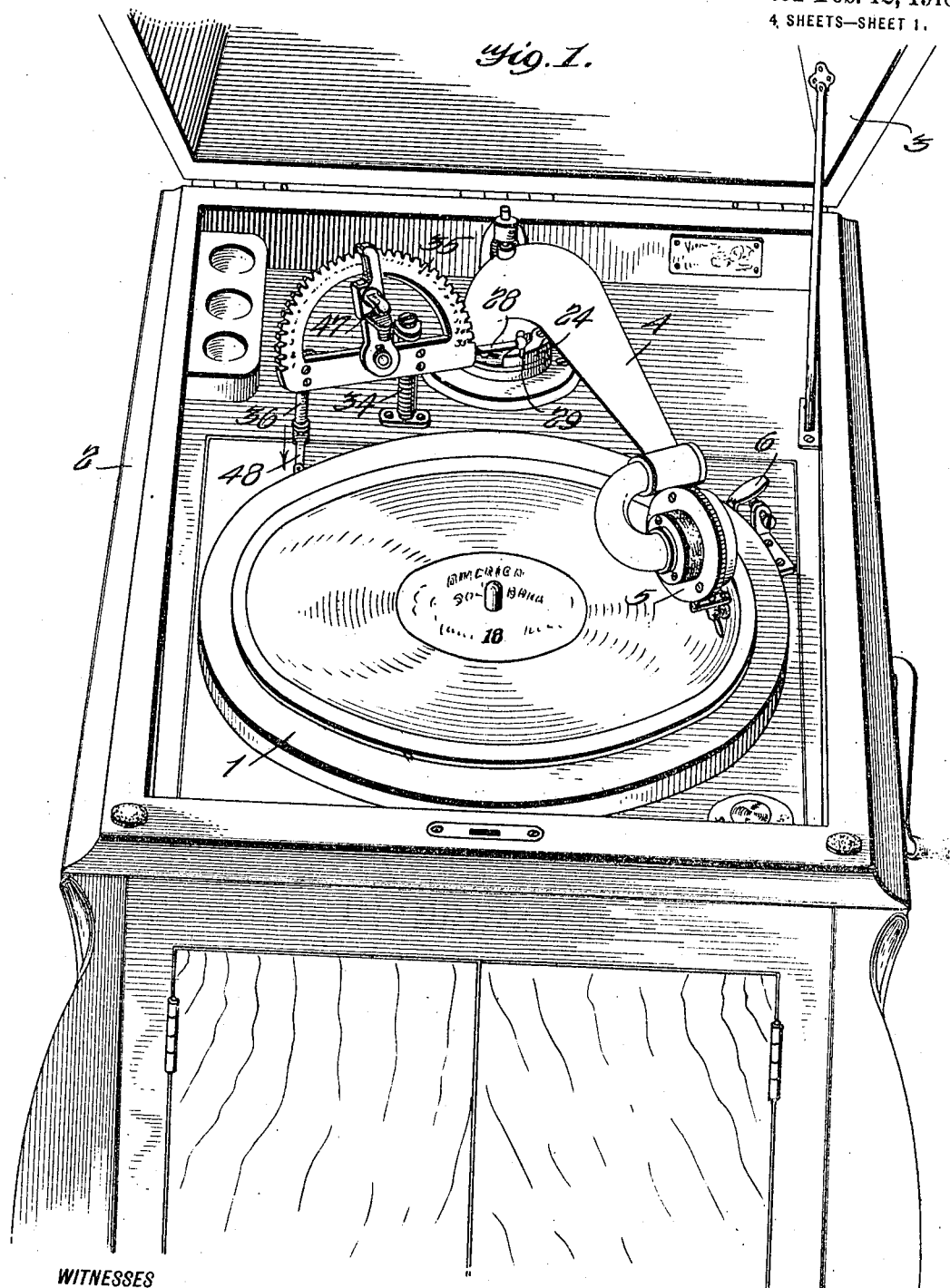

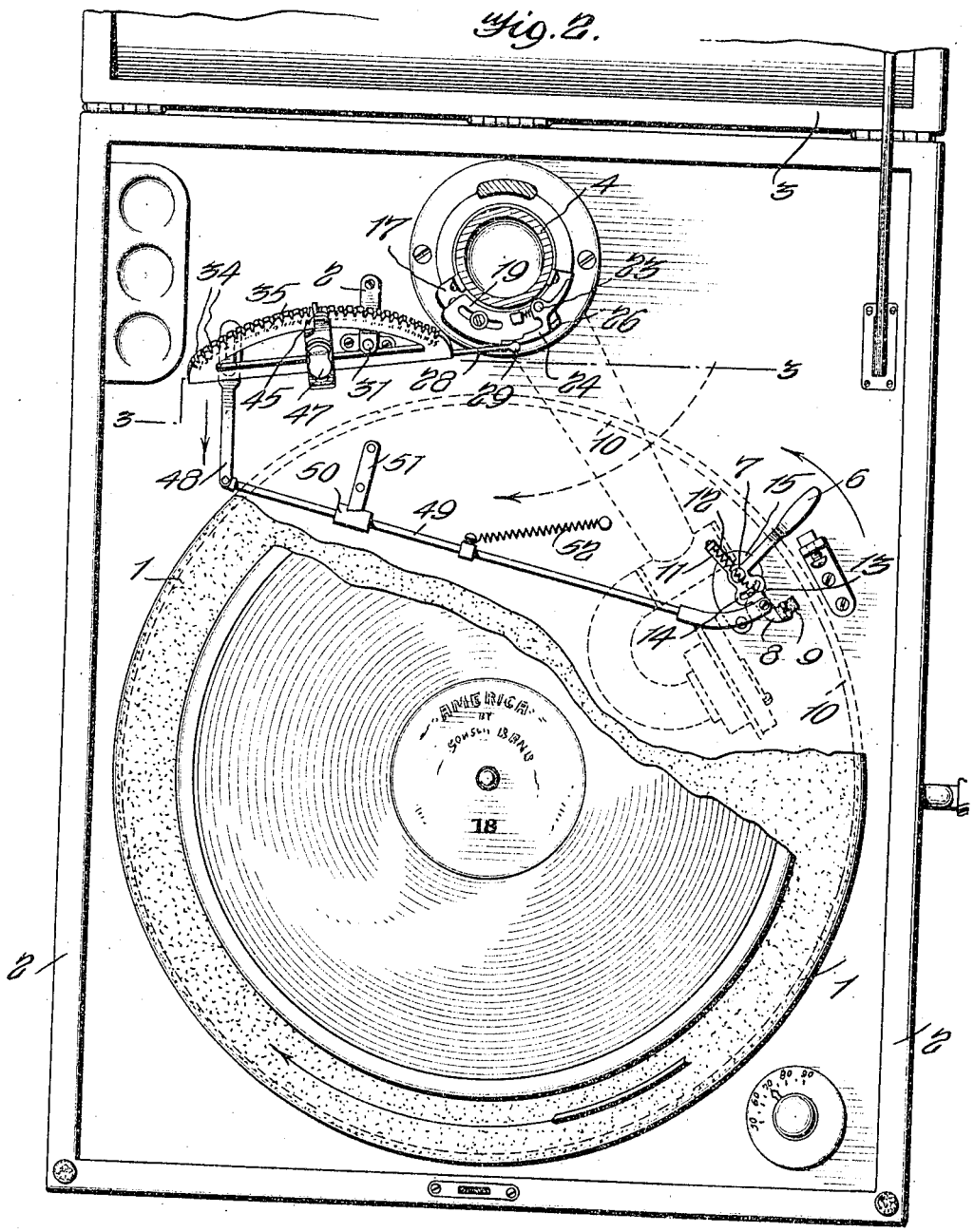

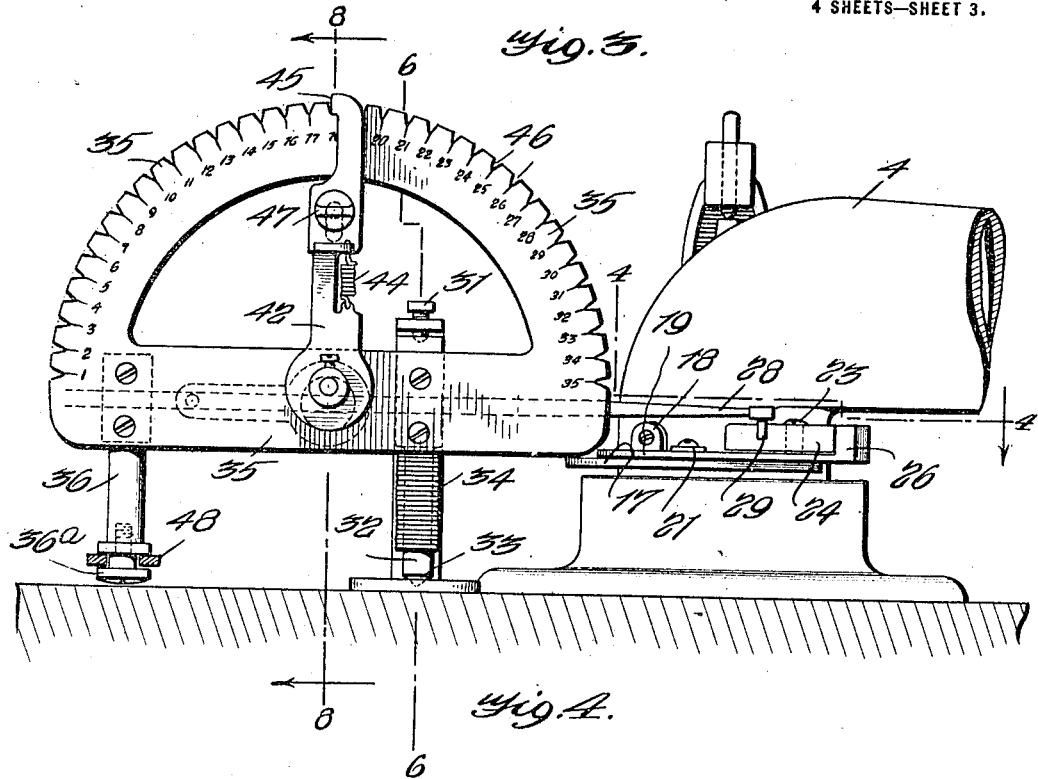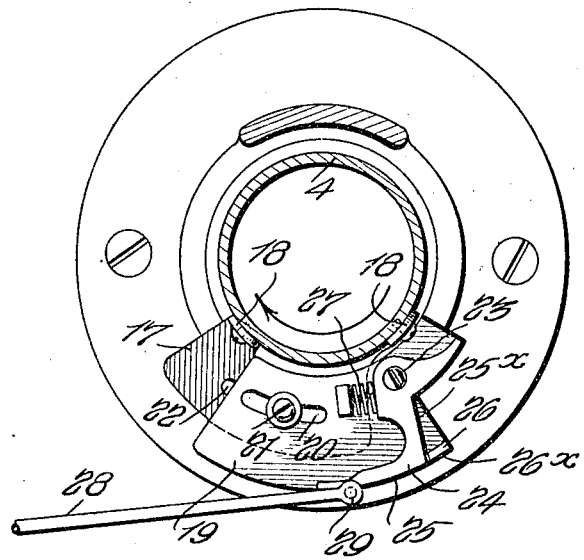

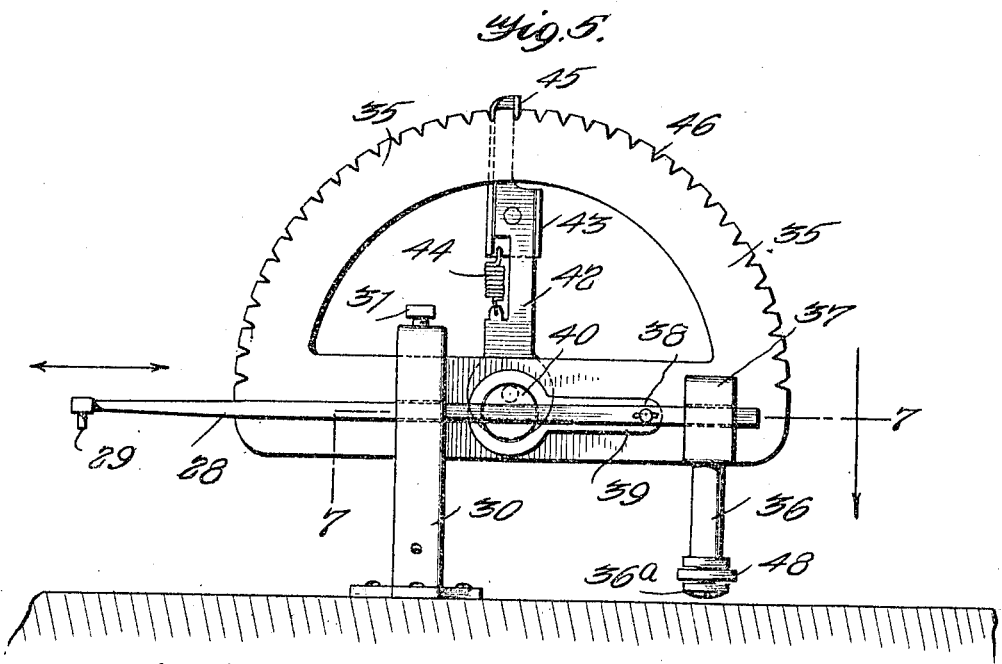
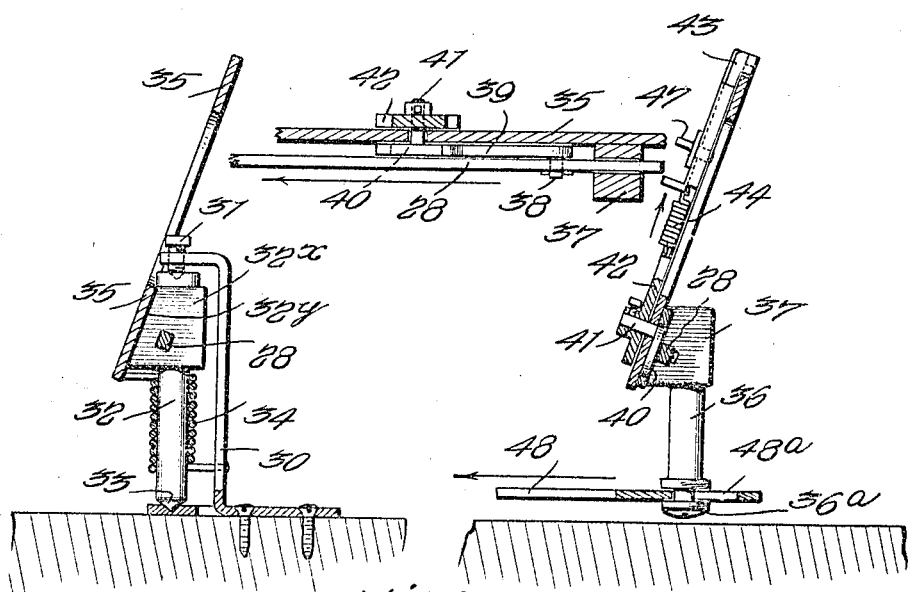
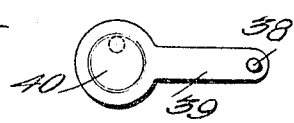

ADAM CROZEN HENDRICKS, OF MARTINSBURG, WEST VIRGINIA.

AUTOMATIC STOP FOR PHONOGRAPHS.

1,256,317.     Specification of Letters Patent.     Patented Feb. 12, 1918.

Application filed August 16, 1917. Serial No. 186,550.

*To all whom it may concern:*

Be it known that I, ADAM C. HENDRICKS, a citizen of the United States, and a resident of Martinsburg, in the county of Berkeley and State of West Virginia, have invented a new and useful Improvement in Automatic Stops for Phonographs, of which the following is a specification.

My invention relates to improvements in automatic stop for phonographs, and consists in the combinations, constructions and arrangements herein described and claimed.

An object of my invention is to provide an automatic stop which is comparatively simple in its structure, but which may be accurately set to stop the machine at the end of a record whether the record be a short one or a long one.

A further object of my invention is to provide an automatic phonograph stop which is actuated by the movement of the tone arm and which does not depend upon the closure of an electric circuit.

A further object of my invention is to provide a device having a dial and a pointer which may be set at any place on the dial to correspond with a given record so as to cause the stopping of the device immediately after the end of the record has been reached.

A further object of my invention is to provide a stopping device which may be used in connection with the ordinary brake such as that used on phonographs of the disk type in which the brake engages an edge of the turn-table.

Other objects and advantages will appear in the following specification, and the novel features of the invention will be particularly pointed out in the appended claims.

My invention is illustrated in the accompanying drawings forming part of this application, in which:

Figure 1 is a perspective view of a disk-phonograph with my improved stop mechanism applied thereto.

Fig. 2 is a plan view of the device, a portion of the turn-table being broken away to show the brake mechanism.

Fig. 3 is a section along the line 3—3 of Fig. 2.

Fig. 4 is a section along the line 4—4 of Fig. 3.

Fig. 5 is a rear view of the dial.

Fig. 6 is a section along the line 6—6 of Fig. 3.

Fig. 7 is a section along the line 7—7 of Fig. 5.

Fig. 8 is a section along the line 8—8 of Fig. 3.

Fig. 9 is a detailed view of an eccentric.

As stated before, the invention is designed primarily for disk machines which have a rotatable table for disk records. In Fig. 1 the rotatable carrier or table 1 is shown as disposed in a cabinet 2 having a hinged cover 3. The tone arm 4 and the sound reproducer 5 are of the usual type. The invention is designed to be used in connection with the ordinary brake which is used with the machine to start and stop the table, the starting being accomplished by the release of the brake, and the stopping by the application of the brake to a portion of the table. In Fig. 2 I have shown the brake handle 6 which is pivotally mounted at 7 and which bears an arm 8 having a resilient buffer 9 arranged to engage a downwardly extending peripheral flange 10 of the table 1. The handle 6 has an arm 11 extending in the opposite direction from the arm 8. The end of the arm 11 is connected by means of a spring 12 with a pin 13 disposed in a slot 14 in the arm 8. The pivot 7 is mounted on a plate 15 which may be secured to the top of the cabinet in position to stop the wheel when the handle 6 is moved. This construction is ordinary; any other spring brake of the general type described might be used in connection with my automatic stopping mechanism.

In connection with an instrument such as I have described in brief, I make use of a novel combination of elements so as to render the brake automatic, this automatic action being controlled by the movement of the tone arm. To this end, I arrange a plate 17 on the vertical part of the tone arm 4 near the pivotal support of the latter. The plate 17 is secured to the tone arm by means of screws which pass through ears 18. Adjustably disposed on the plate 17 is an arc-shaped plate 19 which is provided with a slot 20 and a set-screw 21 arranged to pass through the slot 20 and through openings 22 in the plate 17. The set screw may be tightened so as to secure the plate 19 to the plate 17 at various positions around the tone arm 4. It will be understood that when a desirable position is reached the set screw 21 is tightened so as to keep the plates 17 and 19 in fixed relation.

Pivotally mounted on the plate 19 at 23 is a guide member 24 which has an arc-shaped edge 25 contiguous to an arc-shaped edge $26^x$ of a lug 26 carried by the plate 19, these arcs being on a circle of which the axis of the tone arm is the center. A spring 27 normally holds the guide member 24 in engagement with the lug 26. An arm 28 bears a pin 29. This arm 28 is movable and is under spring tension, as will be explained later, and the pin 29 rides along the guide member 24 and past the lug 26 then swings inwardly, when the movement of the tone arm is in the direction indicated by the arrow in Fig. 4. When the tone arm is moved in the opposite direction the pin 29 engages the surface $25^x$ of the pivoted guide member 24 and turns the latter on its pivot while the pin glides along the inclined surface $25^x$ until it reaches the arc-shaped surface 25, passing between the guide member 24 and the lug 26. Immediately after the pin has passed through the opening the guide member swings back into the position shown in Fig. 4. The arm 28 controls the brake member through a mechanism hereinafter described.

At 30, see Figs. 2, 3, 5 and 6, I have shown a Z-shaped bracket bearing a pivot screw 31 for a pivot rod 32 whose lower end has a cone shaped portion arranged to enter a socket in a plate 33 so that the pivot rod 32 may be turned on its axis. A spiral spring 34 has one end secured to the bracket 30, the other end being secured to the lower part of a semi-circular dial plate 35. This dial plate is secured to an enlarged portion $32^x$ of the pivot post 32 along a side $32^y$ which is inclined to the vertical as clearly shown in Fig. 6. Near the opposite end of the dial, I secure a post 36 by means of a head 37 which is somewhat similar to the head $32^x$. The bar or rod 28 passes through both the heads $32^x$ and 37, being slidably disposed with respect to these two heads. It is pivotally connected at 38, see Fig. 5, with an arm 39 secured to an eccentric 40 which has a shaft 41, see Figs. 5, 7 and 8, which passes through the dial plate 35 and to which is secured an arm 42. The latter bears a slidable locking plate 43 which is normally held by a spring 44 in such a position that its bent upper end 45 engages one of a number of notches 46 in the dial plate 35 to hold the arm in position. A thumb piece 47 is provided, by means of which the slidable locking member 43 may be lifted so as to permit the arm 42 to be moved to various positions along the dial, these positions being indicated by numerals which register with the respective notches 46.

The lower end of the post 36 is provided with a screw $36^A$ which passes through a slot $48^A$ and an arm 48. This is pivotally connected with a link 49 which has a detent 50 arranged to engage a stationary stop 51 on the top of the case. A spring 52 is secured to the link and exerts tension thereon when the link is in the position shown in Fig. 2. The opposite end of the link is pivotally connected with the arm 8 of the brake mechanism.

From the foregoing description of the various parts of the device, the operation thereof may be readily understood.

When a record is first played, it is put on the turn-table in the ordinary manner and the needle is brought to the center of the record and placed just inside of the last convolution of the spiral groove on the record. The locking plate 43 of the arm 42 is now released and the arm 42 is moved. This moves the bar 28 through the medium of the eccentric 40 and link 39. The arm 42 is turned until the pin 29 passes the end of the lug 26, see Fig. 4. The spiral spring 34 will cause the arm 28 to swing inwardly. The arm 42 is now set at the place it was on the dial when the pin first cleared the lug. Let us assume that this place is marked 18 on the dial, as shown in Fig. 3. The record is now marked with the figure 18. Another record is now tested, and it may be found that the arm 42 has to be set at 12 in order for the pin 29 to clear the lug 26 when the needle is just inside the last convolution of the spiral groove on the record. This record is then marked 12; similarly the other records are marked.

Now, when a record is played, it is only necessary to look at the numeral on the record, as for instance, 18, and set the arm 42 at 18 on the dial. The tone arm is now brought out to the beginning of the record and the brake handle 6 is released. The movement of the tone arm out to its initial position brought the pin 29 into the position shown in Fig. 2, while the movement of the brake handle to the releasing position as shown in Fig. 2 started the turn-table in the ordinary manner and brought the link with its detent 50 into locking position with the stop member 51. It also pushed the arm 48 so as to bring the screw $36^A$ at one end of the slot $48^A$, see Fig. 8.

The record is now being played and the tone arm is swinging inwardly in the usual manner. The guide member 24 together with the lug 26 are turning, that is to say, are rotating past the pin 29. As soon as the pin clears the lug 26, the spring 34 will cause the arm 28 to swing inwardly, forcing the arm 48 outwardly, moving the link so as to disengage the detent 50, whereupon the spring 52 will pull the link and with it the arm 8 of the brake spring mechanism, into the stopping position; that is to say into frictional contact with the flange 10 of the turn-table, thus stopping the movement of the latter.

I claim:

1. The combination with a disk phonograph having a friction brake and a movable tone arm, of a guide member carried by the tone arm, a spring pressed bar normally held against the guide member and adapted to clear the latter during the movement of the tone arm, connections between said brake and said bar for setting the brake when the bar has cleared the guide member, and means for adjusting the position of the bar with respect to the end of the guide member so as to vary the point at which the bar clears the guide member.

2. The combination with a disk phonograph having a friction brake and a movable tone arm, of a guide member consisting of a movable part and a fixed part, said movable part being arranged to engage said fixed part when the tone arm is moving from the outer to the inner portion of the record, a spring pressed bar having a pin arranged to slide on said guide members and to clear said guide members during the movement of the tone arm from the outer to the inner portion of the record, and means for communicating the movement of the bar to the brake mechanism to set the latter.

3. The combination with a disk phonograph having a friction brake and a movable tone arm, of a guide member consisting of a movable part and a fixed part, said movable part being arranged to engage said fixed part when the tone arm is moving from the outer to the inner portion of the record, a spring pressed bar having a pin arranged to slide on said guide members and to clear said guide members during the movement of the tone arm from the outer to the inner portion of the record, means for communicating the movement of the bar to the brake mechanism to set the latter, and means for shifting the position of the bar and its pin toward and away from the stationary part of the guide member.

4. The combination with a disk phonograph having a friction brake and a movable tone arm, of a guide member consisting of a movable part and a fixed part, said movable part being arranged to engage said fixed part when the tone arm is moving from the outer to the inner portion of the record, a spring pressed bar having a pin arranged to slide on said guide members and to clear said guide members during the movement of the tone arm from the outer to the inner portion of the record, means for communicating the movement of the bar to the brake mechanism to set the latter, means for shifting the position of the bar and its pin toward and away from the stationary part of the guide member, said means comprising a disk, an eccentric carried by the disk, means connecting said eccentric with said bar for moving the latter, and a handle connected with the eccentric and arranged to move over the face of the disk.

5. The combination with a disk phonograph having a friction brake and a movable tone arm, of a guide member consisting of a movable part and a fixed part, said movable part being arranged to engage said fixed part when the tone arm is moving from the outer to the inner portion of the record, a spring pressed bar having a pin arranged to slide on said guide members and to clear said guide members during the movement of the tone arm from the outer to the inner portion of the record, means for communicating the movement of the bar to the brake mechanism to set the latter, means for shifting the position of the bar and its pin toward and away from the stationary part of the guide member, said means comprising a disk, an eccentric carried by the disk, means connecting said eccentric with said bar for moving the latter, a handle connected with the eccentric and arranged to move over the face of the disk, and locking means for said handle, consisting of a series of notches disposed on the face of the disk, and spring means carried by the handle and arranged to enter the notches.

ADAM CROZEN HENDRICKS.

Witnesses:
Roy Harrison,
A. D. Darby.